W. J. KING.
RECOIL ARRESTER.
APPLICATION FILED OCT. 3, 1910.
1,044,188.
Patented Nov. 12, 1912.
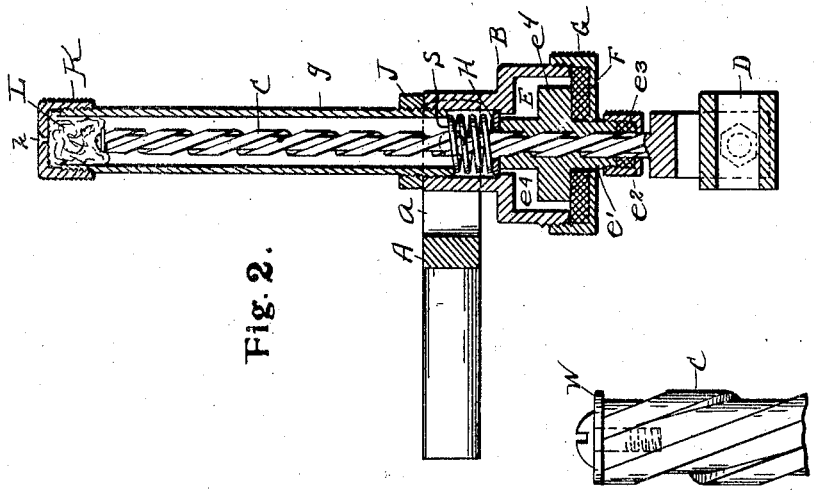
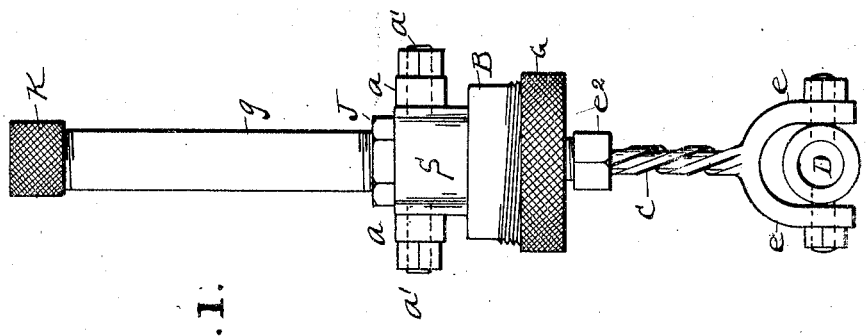
William J. King, Inventor
Parker & Burton, Attorneys

UNITED STATES PATENT OFFICE.

WILLIAM J. KING, OF GRAND BLANC, MICHIGAN.

RECOIL-ARRESTER.

1,044,188.  Specification of Letters Patent.  Patented Nov. 12, 1912.

Application filed October 3, 1910. Serial No. 585,017.

*To all whom it may concern:*

Be it known that I, WILLIAM J. KING, a citizen of the United States, residing at Grand Blanc, county of Genesee, State of Michigan, have invented a certain new and useful Improvement in Recoil-Arresters, and declare the following to be a full, clear, and exact description of the same, such as will enable others skilled in the art to which it pertains to make and use the same, reference being had to the accompanying drawings, which form a part of this specification.

My invention relates to recoil arresters as used on carriages between the axle and the carriage body, when such body is supported by springs, and it consists in the novel construction and combination hereinafter described and claimed.

In the drawings,—Figure 1 is a vertical elevation of my apparatus or recoil arrester. Fig. 2, is a vertical section of the same at right angles to the view in Fig. 1, the screw and spring hereinafter described not being sectioned. Fig. 3 shows the arrangement at the end of the screw which prevents its being withdrawn from the nut, thereby operating as a check to oscillation as hereinafter described.

In the drawings similar letters refer to similar parts.

Inasmuch as the recoil arrester, or shock absorber, as sometimes called, is familiar to those skilled in the art and its manner of adjustment on the frame and axle of the car is also well known, I have not shown or described anything more than the arrester itself with sufficient means of adjustment to enable anyone so skilled to apply it.

A represents a bar, forked at one end, each side of the fork $a$, $a$, shown in Fig. 1, being pivotally attached to a casing B. The bar A turns vertically on pivots $a'$, $a'$, formed on the ends of the forks $a$, $a$, which pivots are in the plane of the vertical axis of the whole structure.

C is a screw of very coarse pitch, the lower end of which is forked at $e$, $e$, and within said fork is pivoted a thimble or hollow holding device D which may be adjusted upon any convenient attachment to the axle and which also when oscillated, is in a plane substantially parallel to and corresponding to the plane of the oscillations of the bar A. It is obvious that such attachment of D to the axle would prevent the screw C from rotating, and thereby it becomes what may be termed a fixed screw.

E is a rotative nut in the casing B, having corresponding threads to and engaging screw C, which nut by the vertical movement of the screw C is compelled to turn thereby. This nut has a collar $e^4$ made integral with it, which is of less thickness than the depth of the chamber in which it is located, and which is adapted to press upon a fiber washer F located in the cap G of the chamber, which cap is secured thereon in such manner as to compress the fiber washer F between the end of the casing B and the cap G. The nut has an extension $e'$ passing through an orifice in the cap G, upon which extension is formed a stuffing box by a perforated cap $e^2$. The interior of this stuffing box is filled with fibrous material $e^3$, which engages in the threads of the screw, and as the screw is forced in or out through the nut the stuffing rotating with the nut wipes out and cleans the screw-threads. This is an important feature in my construction. At the upper end of the nut there is another projection $e^4$ which forms a continuation thereof and supports a washer H. Upon this washer rests a spiral spring S. Screwed into the interior of the upper part of the casing is another case $g$ engaging the spring which is thus adjustably compressed between the lower extension of this case and the nut. This provides for an adjustable tension upon the spring whereby the action of the recoil arrester can be adjusted and controlled as hereinafter described. A jam nut J is threaded upon the case $g$, which can be used to prevent its accidental turning and loss of adjustment after being once adjusted. The case $g$ incloses the screw C, and at its upper end it is closed by the perforated screw-cap K. In the upper end a sponge or equivalent material, as shown at L, may be inserted and oiled through the oil hole $k$. When the upper end of the screw C comes in contact with this oiled sponge the oil is squeezed out of it and, as is obvious, it runs down the screw-heads and lubricates them.

It is obvious that when the recoil arrester is in the position shown in Fig. 1 the forcing out of the non-rotatable screw C against the rotatable nut E would tend to compress the spring S and thus relieve the frictional contact of the extension of the nut upon the fiber washer F, in which position the nut would turn relatively quite easily. On the return or rebound the screw C would be non-rotatably drawn out from the casing J, and the nut E, compelling the nut to rotate but causing it to impinge against the fiber washer G, thereby creating more or less friction depending on the pressure and tension thereon which is assisted by the spring S, therefore the closing of the springs of the carriage would not be seriously resisted, whereas the rebound of said springs would be checked in the manner described.

At the upper end of the screw C, as shown in Fig. 3, there is attached a strong washer W, of the same diameter as the full diameter of the screw-threads thereby closing the internal cut threads, and it is obvious that if the screw was drawn out to its full length the washer W would come in contact with the nut E and arrest any further motion on the recoil or rebound, thereby operating in the same manner as though supporting straps had been attached to the carriage and inclosing the axle, so that on the rebound the straps would come in contact with the axle and prevent the separation of the body and the axle.

The operation of this recoil arrester is sufficiently evident from the foregoing description.

Having thus described my invention what I desire to claim is:

1. In a recoil arrester, the combination of a non-rotatable screw, a casing within which said screw is inclosed, a rotatable nut inclosed in said casing, a spring adapted to force said nut in one direction while permitting it to turn, a friction washer upon the opposite side of said nut and a rotatable stuffing-box formed upon an extension of said nut engaging and clearing the threads of said screw, substantially as described.

2. A recoil arrester, having in combination, a screw, a friction washer engaging thereabout, a nut running on the screw and revoluble by the lengthwise movement of the screw, a casing about the screw and a spring contained in the casing and tending to press the nut and washer together, whereby in the movement of the screw in one direction the nut is forced away from the friction washer and a gradually increasing resistance is afforded by the spring, and upon the return movement of the screw, the recoil is checked by the frictional engagement of the nut and friction washer which is enhanced by the spring and which is comparatively greater than the resistance on the movement of the screw in the opposite direction, substantially as described.

3. A recoil arrester, having in combination, a screw, a friction washer engaging thereabout, a nut running on the screw and revoluble by the lengthwise movement of the screw, a casing about the screw, a spring contained in the casing and tending to press the nut and washer together and a closed-end tube adapted to be screwed into the casing to adjust the compression of the spring and contain lubricant, whereby in the movement of the screw in one direction the nut is forced away from the friction washer and a gradually increasing resistance is afforded by the spring, and upon the return movement of the screw, the recoil is checked by the frictional engagement of the nut and friction washer which is enhanced by the spring and which is comparatively greater than the resistance on the movement of the screw in the opposite direction, substantially as described.

4. In a recoil arrester, the combination of a screw adapted to move lengthwise, a nut running on said screw, a friction washer with which said nut can frictionally engage, a casing about the screw provided with a closed-end member in which the end of the screw reciprocates and a spongy material contained in the end of said member and adapted to contain a lubricant which is taken up by the screw by contact with the spongy material, substantially as described.

5. In a recoil arrester, the combination of a screw adapted to move lengthwise, a nut running on said screw, a friction washer with which said nut can frictionally engage, a casing about the screw provided with a closed-end member in which the end of the screw reciprocates, a spongy material contained in the bottom of the said member and adapted to contain lubricant which is taken up by the screw by contact with the spongy material and a stuffing box located at the opposite end of the casing and adapted to wipe the screw-threads as the screw reciprocates in and out of the casing, substantially as described.

In testimony whereof, I sign this specification in the presence of two witnesses.

WILLIAM J. KING.

Witnesses:
N. V. BELLES,
R. A. PARKER.